United States Patent
Timmons

(10) Patent No.: US 9,849,581 B2
(45) Date of Patent: Dec. 26, 2017

(54) ACCESSIBLE TEMPORARY MAGNET CONTROL FOR MAGNETIC DRILL PRESS

(71) Applicant: Milwaukee Electric Tool Corporation, Brookfield, WI (US)

(72) Inventor: Terry L. Timmons, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 380 days.

(21) Appl. No.: 14/256,098

(22) Filed: Apr. 18, 2014

(65) Prior Publication Data

US 2014/0314506 A1    Oct. 23, 2014

Related U.S. Application Data

(60) Provisional application No. 61/813,813, filed on Apr. 19, 2013.

(51) Int. Cl.
*B25H 1/00* (2006.01)
*B23B 45/00* (2006.01)

(52) U.S. Cl.
CPC ............ *B25H 1/0071* (2013.01); *B23B 45/00* (2013.01); *B25H 1/0021* (2013.01); *Y10T 408/13* (2015.01); *Y10T 408/16* (2015.01); *Y10T 408/554* (2015.01)

(58) Field of Classification Search
CPC ... Y10T 408/13; Y10T 408/14; Y10T 408/16; Y10T 408/17; Y10T 408/18; B23B 45/00; B25H 1/0021; B25H 1/0071; B25H 1/0064
USPC .................................. 83/574, 745
See application file for complete search history.

(56) References Cited

U.S. PATENT DOCUMENTS

| | | | | |
|---|---|---|---|---|
| 2,887,910 A | * | 5/1959 | Williamson, Jr. ... | B25H 1/0071 403/53 |
| 3,371,257 A | * | 2/1968 | Warren ................. | B23Q 15/00 318/39 |
| 4,261,673 A | * | 4/1981 | Hougen ............... | B23Q 9/0014 408/135 |
| 4,278,371 A | * | 7/1981 | Meyer ................. | B25H 1/0071 408/710 |
| 4,530,624 A | | 7/1985 | Cuneo | |

(Continued)

FOREIGN PATENT DOCUMENTS

| | | |
|---|---|---|
| JP | 03027538 | 4/2000 |
| JP | 2002254227 | 9/2002 |

(Continued)

OTHER PUBLICATIONS

International Search report and Written Opinion for Application No. PCT/US2014/034587 dated Aug. 29, 2014 (13 pages).

(Continued)

*Primary Examiner* — Daniel Howell
*Assistant Examiner* — Yasir Diab
(74) *Attorney, Agent, or Firm* — Michael Best & Friedrich LLP

(57) ABSTRACT

A drill press includes a main housing, a base coupled to the main housing and having an electromagnet, a drill unit supported by the main housing for relative movement therewith, a first switch selectively electrically connecting the electromagnet to a power source to energize the electromagnet, and a second switch for selectively interrupting power to the electromagnet.

11 Claims, 2 Drawing Sheets

(56) References Cited

U.S. PATENT DOCUMENTS

| | | | | |
|---|---|---|---|---|
| 4,559,577 | A | * | 12/1985 | Shoji .................... B25H 1/0071 318/434 |
| 4,591,301 | A | | 5/1986 | Pelfrey |
| 4,604,006 | A | * | 8/1986 | Shoji ..................... B23Q 11/04 408/11 |
| 5,007,776 | A | * | 4/1991 | Shoji ..................... B23Q 11/04 408/11 |
| 5,096,339 | A | * | 3/1992 | Shoji .................... B25H 1/0071 408/6 |
| 5,342,153 | A | * | 8/1994 | Dobkins .............. B25H 1/0064 408/1 R |
| 7,075,195 | B2 | * | 7/2006 | Feil ........................ H02H 11/00 307/125 |
| 2006/0104731 | A1 | | 5/2006 | Etter et al. |
| 2009/0028653 | A1 | | 1/2009 | Wilbert et al. |
| 2009/0196696 | A1 | | 8/2009 | Otsuka et al. |
| 2010/0021249 | A1 | | 1/2010 | Beichter |
| 2012/0031635 | A1 | * | 2/2012 | Svennung ................ B25F 5/00 173/20 |

FOREIGN PATENT DOCUMENTS

| | | |
|---|---|---|
| JP | 2004009149 | 1/2004 |
| KR | 1020130020403 | 2/2013 |
| WO | 2013/163412 | 10/2013 |

OTHER PUBLICATIONS

Milwaukee, "Service Parts List, Mag Stand Assembly", 2011, Bulletin No. 54-46-0400 (4 pages).

\* cited by examiner

ACCESSIBLE TEMPORARY MAGNET CONTROL FOR MAGNETIC DRILL PRESS

CROSS-REFERENCE TO RELATED APPLICATIONS

This application claims priority to co-pending U.S. Provisional Patent Application No. 61/813,813 filed on Apr. 19, 2013, the entire content of which is incorporated herein by reference.

FIELD OF THE INVENTION

The present invention relates to power tools, and more particularly to drill presses.

BACKGROUND OF THE INVENTION

Portable magnetic drill presses are typically used to drill holes in a workpiece to which the drill press is magnetically latched. Such drill presses can be heavy and difficult to hold by a user in an overhead or sideways orientation during attachment of the drill press to the workpiece being drilled.

SUMMARY OF THE INVENTION

The invention provides, in one aspect, a drill press including a main housing, a base coupled to the main housing and having an electromagnet, a drill unit supported by the main housing for relative movement therewith, a first switch selectively electrically connecting the electromagnet to a power source to energize the electromagnet, and a second switch for selectively interrupting power to the electromagnet.

The invention provides, in another aspect, a drill press including a main housing, a base coupled to the main housing and having an electromagnet, a drill unit supported by the main housing for relative movement therewith, a first switch actuatable between a closed state, in which power is delivered to the electromagnet from a power source to energize the electromagnet, and an open state, in which power to the electromagnet is interrupted, and a second switch wired in series with the first switch for selectively interrupting power to the electromagnet when the first switch is in the closed state.

The invention provides, in a further aspect, a drill press including a main housing, a handle coupled to the main housing, a base coupled to the main housing and having an electromagnet, a drill unit supported by the main housing for relative movement therewith, a toggle switch actuatable between a closed state, in which power is delivered to the electromagnet from a power source to energize the electromagnet, and an open state, in which power to the electromagnet is interrupted, and a normally closed momentary switch wired in series with the toggle switch for selectively interrupting power to the electromagnet when the toggle switch is in the closed state. The momentary switch is proximate the handle. The momentary switch is actuatable by a user of the drill press with a single hand, while gripping the handle, to interrupt power to the electromagnet when the toggle switch is in the closed state.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
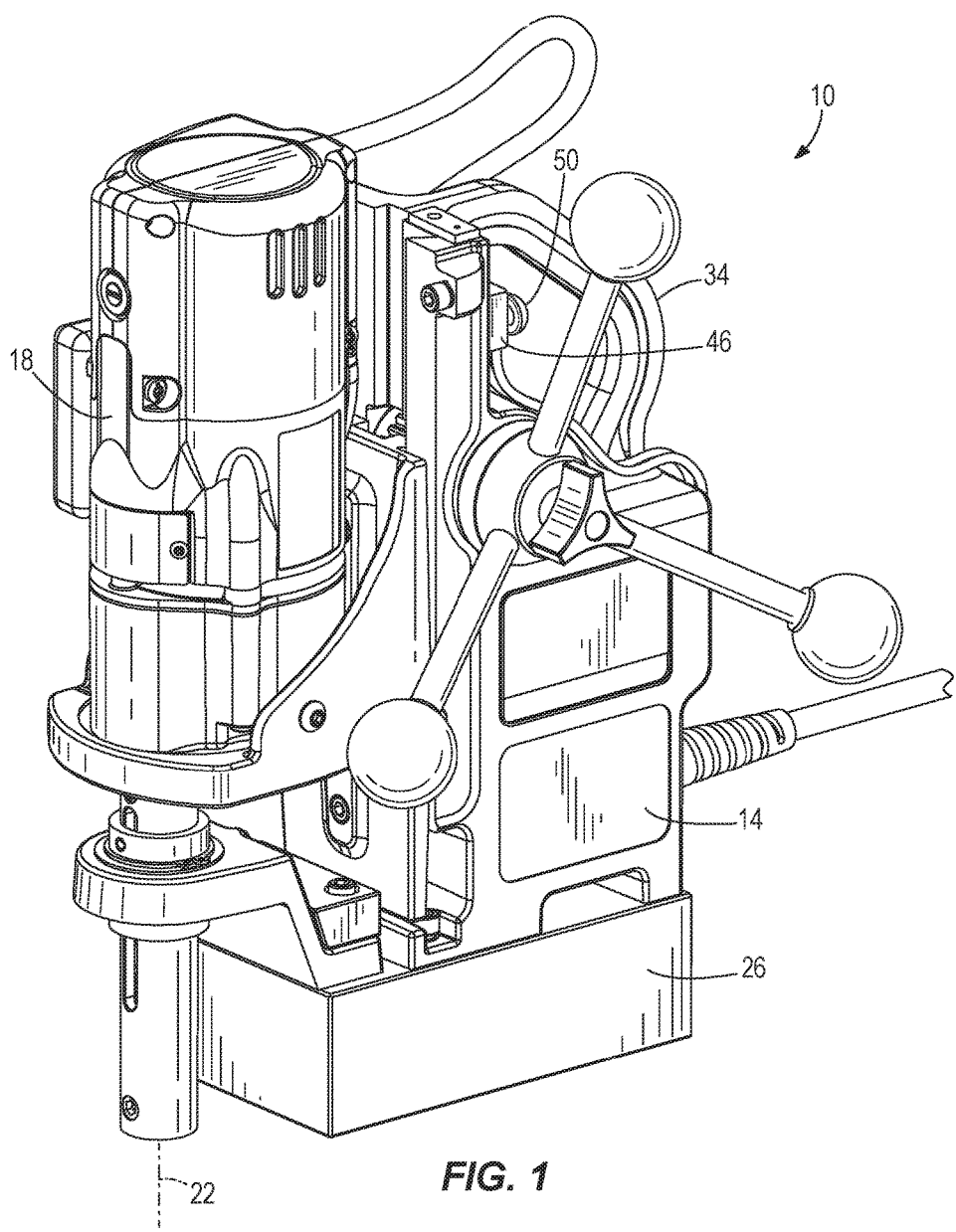
FIG. 1 is a perspective view of a magnetic drill press in accordance with an embodiment of the invention.

FIG. 1 illustrates a magnetic drill press 10 including a main housing 14 and a drill unit 18 that is movable relative to the main housing 14, along a drilling axis 22, for drilling holes into a workpiece. The drill press 10 also includes a base 26 coupled to the main housing 14 (e.g., using fasteners) for supporting the main housing 14 and the drill unit 18 on the workpiece. In the illustrated embodiment of the drill press 10, the base 26 includes one or more electromagnets 30 (FIG. 2) therein for magnetically latching the base 26 to a ferromagnetic workpiece.

With reference to FIG. 1, the drill press 10 includes a handle 34 coupled to the main housing 14. In the illustrated embodiment of the drill press 10, the handle 34 is integrally formed as a single piece with the main housing 14. Alternatively, the handle 34 may be a separate component from the main housing 14 and coupled thereto by any of a number of different structural elements and/or processes (e.g., using fasteners, by welding, etc.). The handle 34 is located near the top of the main housing 14 to facilitate carrying the drill press 10 and positioning the drill press 10 on a workpiece.

Figure 2:
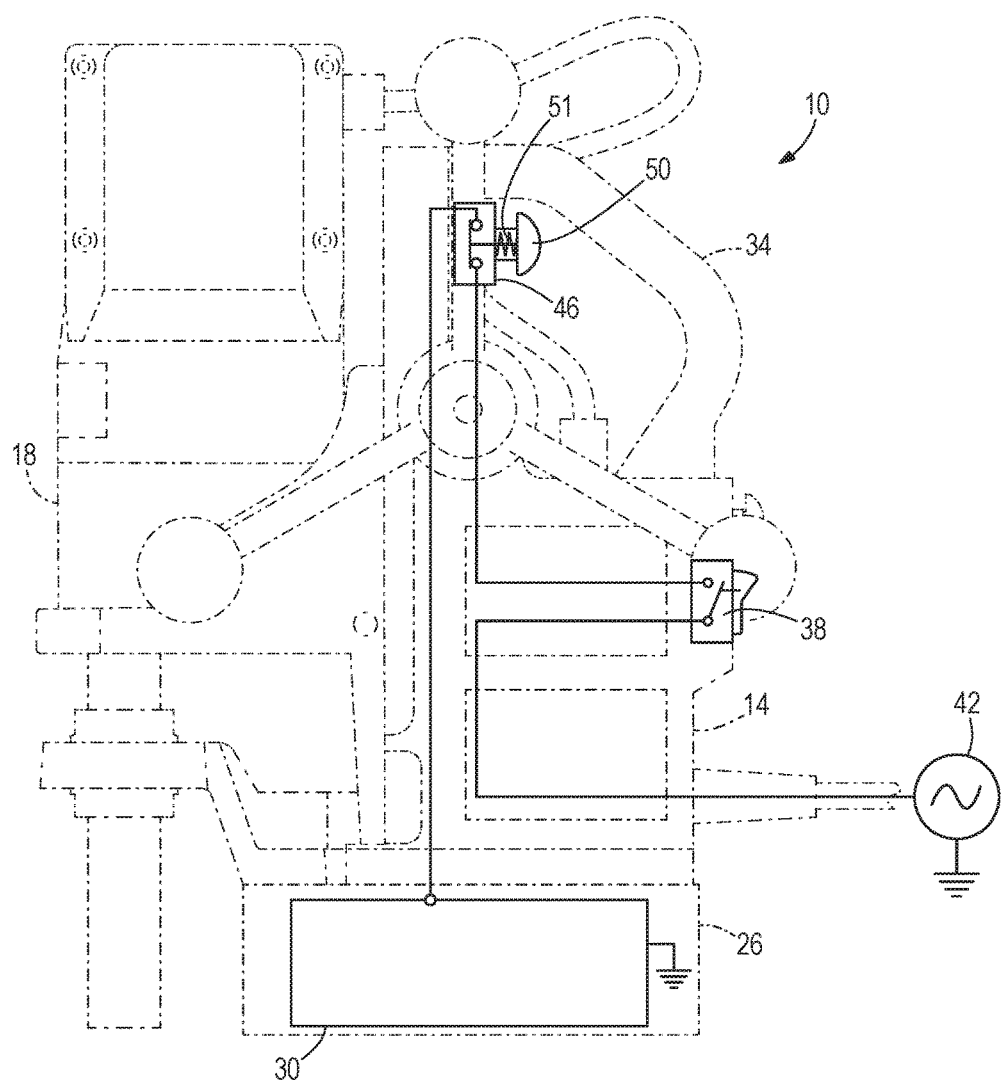
FIG. 2 is an electrical schematic for the magnetic drill press of FIG. 1.

With reference to FIG. 2, the drill press 10 also includes a first, main power switch 38 located on the rear of the main housing 14 for selectively electrically connecting the electromagnets 30 to a power source 42 to energize the electromagnets 30. In the illustrated embodiment of the drill press 10, the main power switch 38 is a toggle switch wired in series (FIG. 2) between the power source 42 (e.g., AC line current, DC current provided by a remote or on-board battery, etc.) and the electromagnets 30 that is actuatable between an open state, in which power to the electromagnets 30 is interrupted, and a closed state, in which power is delivered to the electromagnets 30. Alternatively, the main power switch 38 may be configured differently provided that it's capable of switching between the open and closed states in response to user input.

With reference to FIGS. 1 and 2, the drill press 10 further includes a second, power interruption switch 46 wired in series with the main power switch 38 and between the power source 42 and the electromagnets 30 for selectively interrupting power to the electromagnets 30 when the main power switch 38 is in the closed state. In the illustrated embodiment of the drill press 10, the power interruption switch 46 is a normally closed momentary switch including a plunger 50 (FIG. 1) that is actuated or depressed by a user of the drill press 10, against the bias of an internal spring 51, for momentarily opening the switch 46 to interrupt power to the electromagnets 30 when the main power switch 38 is in its closed state. Releasing the plunger 50 allows the spring 51 to return the plunger 50 to its extended position, thereby closing the switch 46 once again. Alternatively, the power interruption switch 46 may be configured as a normally closed momentary switch having a different configuration (e.g., a rocker or toggle). As a further alternative, the power interruption switch 46 may be configured as a conventional normally closed switch that must be manually actuated between open and closed states. As yet another alternative, rather than wiring the power interruption switch 46 in series with the main power switch 38, the power interruption switch 46 may be wired to a microcontroller or other software-based electrical component within the drill press 10 which, in turn, temporarily opens the circuit between the power source 42 and the electromagnets 30 to de-energize the electromagnets 30 in response to the power interruption switch 46 being actuated.

With continued reference to FIG. 1, the power interruption switch 46 is located proximate the handle 34 to permit the user of the drill press 10 to actuate the power interruption switch 46 with a single hand, while gripping the handle 34, to temporarily de-energize the electromagnets 30. In the illustrated embodiment of the drill press 10, the power interruption switch 46 is mounted to the main housing 14, with the plunger 50 oriented substantially transversely to the drilling axis 22. In this manner, a user of the drill press 10 can grasp the handle 34 with their fingers and actuate the power interruption switch 46 with their thumb. Alternatively, the power interruption switch 46 may be attached to the handle 34 and configured as a trigger that may be actuated with one of the user's fingers.

In operation of the drill press 10, the drill press 10 may be placed and supported upon a horizontal workpiece. Grasping the handle 34, the user can first coarsely align the drilling axis 22 with a desired hole location on the workpiece, and then finely adjust the position of the drill press 10 by nudging the base 26 and/or the handle 34. The main power switch 38 can then be actuated to electrically connect the power source 42 with the electromagnets 30, thereby energizing the electromagnets 30. Once energized, the electromagnets 30 magnetically latch the base 26 to the ferromagnetic workpiece to stabilize the drill press 10, permitting the user to drill the hole with the drill unit 18.

Should the user desire to use the drill press 10 in an overhead or sideways orientation, the user may first lift the drill press 10 for initial placement on an overhead or vertical ferromagnetic workpiece. Once placed, the main power switch 38 can be actuated to electrically connect the power source 42 with the electromagnets 30, thereby energizing the electromagnets 30 to magnetically latch the drill press 10 to the workpiece. If the initial placement of the drill press 10 requires adjustment to a desired hole location in the workpiece, the user (while supporting the drill press 10) can then actuate the plunger 50, temporarily opening the power interruption switch 46 to de-energize the electromagnets 30 and unlatching the drill press 10 from the workpiece. This way, the user of the drill press 10 may expeditiously adjust the drill press 10 to the desired hole location while maintaining their grasp of the handle 34. After adjustment is completed, the plunger 50 is released, thereby closing the power interruption switch 46 and re-latching the drill press 10 to the workpiece. The user may then proceed to operate the drill unit 18 for drilling a hole in the workpiece.

Various features of the invention are set forth in the following claims.

What is claimed is:

1. A drill press comprising:
   a main housing;
   a handle coupled to the main housing;
   a base coupled to the main housing and including an electromagnet;
   a drill unit supported by the main housing for relative movement therewith;
   a toggle switch actuatable between a closed state, in which power is delivered to the electromagnet from a power source to energize the electromagnet, and an open state, in which power to the electromagnet is interrupted; and
   a normally closed momentary switch wired in series with the toggle switch for selectively interrupting power to the electromagnet when the toggle switch is in the closed state, wherein the momentary switch is proximate the handle, and wherein the momentary switch is actuatable by a user of the drill press with a single hand, while gripping the handle, to interrupt power to the electromagnet when the toggle switch is in the closed state.

2. The drill press of claim 1, wherein the normally closed momentary switch includes an internal spring that biases the normally closed momentary switch into a normally closed state.

3. The drill press of claim 1, wherein the normally closed momentary switch is actuated by a plunger movable in a direction transverse to a drilling axis.

4. The drill press of claim 1, wherein the second switch includes an internal spring that biases the second switch into a normally closed state.

5. The drill press of claim 1, wherein the second switch is actuated by a plunger movable in a direction transverse to a drilling axis.

6. A method of attaching an electromagnet in a base of a drill press to a workpiece, the method comprising:
   positioning the base on the workpiece;
   energizing the electromagnet by actuating a first switch to electrically connect the electromagnet to a power source;
   interrupting power to the electromagnet by actuating a second switch;
   re-positioning the base on the workpiece; and
   re-energizing the electromagnet by releasing the second switch.

7. The method of claim 6, wherein the second switch is a normally closed momentary switch.

8. The method of claim 6, wherein the first switch is actuatable between an open state, in which power to the electromagnet is interrupted, and a closed state, in which power is delivered to the electromagnet.

9. The drill press of claim 8, wherein actuating the second switch opens the second switch to interrupt power to the electromagnet regardless of the state of the first switch.

10. The drill press of claim 6, wherein the second switch is wired in series with the first switch.

11. The drill press of claim 6, further comprising a handle coupled to the main housing, wherein the second switch is proximate the handle, and wherein actuating the second switch is done by a user of the drill press with a single hand, while gripping the handle, to interrupt power to the electromagnet.

* * * * *